United States Patent
Britton et al.

(10) Patent No.: US 6,861,972 B2
(45) Date of Patent: Mar. 1, 2005

(54) OBJECT DETECTION APPARATUS AND METHOD

(75) Inventors: Michael Britton, Ottawa (CA); Chiko Lee, Kanata (CA); Jim Pedersen, Ottawa (CA)

(73) Assignee: Ellistar Sensor Systems, Inc., Ottawa (CA)

( * ) Notice: Subject to any disclaimer, the term of this patent is extended or adjusted under 35 U.S.C. 154(b) by 0 days.

(21) Appl. No.: 10/627,667

(22) Filed: Jul. 28, 2003

(65) Prior Publication Data

US 2005/0024257 A1 Feb. 3, 2005

(51) Int. Cl.[7] .............................................. G01S 13/00
(52) U.S. Cl. ........................... 342/70; 342/22; 342/27; 342/129
(58) Field of Search ............................ 342/5, 22, 26, 342/27, 70–72, 118, 124, 129, 165

(56) References Cited

U.S. PATENT DOCUMENTS

| | | | | |
|---|---|---|---|---|
| 5,281,949 A | * | 1/1994 | Durley et al. ............... | 340/433 |
| 5,420,591 A | * | 5/1995 | Annee et al. ................ | 342/188 |
| 5,563,848 A | * | 10/1996 | Rogers et al. ................ | 367/99 |
| 5,974,881 A | * | 11/1999 | Donskoy et al. .............. | 73/579 |
| 5,979,240 A | * | 11/1999 | Rix et al. ...................... | 73/602 |
| 6,366,232 B1 | * | 4/2002 | Liedtke et al. ................ | 342/22 |
| 2002/0101593 A1 | * | 8/2002 | Yang et al. .................. | 356/484 |
| 2002/0159334 A1 | * | 10/2002 | Caulfield ...................... | 367/87 |
| 2002/0177961 A1 | * | 11/2002 | Lovegren et al. ............. | 702/50 |
| 2003/0163042 A1 | * | 8/2003 | Salmon ...................... | 600/436 |
| 2003/0197126 A1 | * | 10/2003 | Sato et al. ............. | 250/339.11 |

* cited by examiner

Primary Examiner—Thomas H. Tarcza
Assistant Examiner—Isam Alsomiri (57) ABSTRACT

In order to detect and classify objects in a relatively small obstruction-filled space (e.g. underneath a vehicle), a sensing method and apparatus incorporating the use of at least two carefully selected transmission frequencies is provided. In embodiments where the transmission frequencies are radio frequencies, the sensing apparatus can be considered and analysed as a short-range radar system. Alternatively, if the transmission frequencies are acoustic, the sensing apparatus can be considered and analysed as a sonar-based system.

27 Claims, 5 Drawing Sheets

OBJECT DETECTION APPARATUS AND METHOD

FIELD OF THE INVENTION

This invention relates generally to sensor systems and, in particular, multi-frequency sensing systems.

BACKGROUND

Presently available vehicle sensing systems are designed for mounting onto the bumpers of a vehicle such that only objects, animals or people in the reverse or forward paths of the vehicle may be detected. The bulk of the present market for such vehicle sensing systems is made up of acoustic (i.e. sonar-based) and Doppler-based radar devices. Due to some inherent limitations of the technologies upon which they are based, these types of devices do not work very well in obstruction filled and frequently changing spaces, such as underneath a vehicle. In fact, the area underneath a vehicle is a risk zone that is simply ignored by most manufacturers.

Acoustic devices are notorious for their poor performance regarding the elimination and filtering out of ambient noise. The vibration and noise underneath an operating vehicle obviously exacerbates this problem. Moreover, acoustic devices have less directive signal sources and receivers than common radio electronics. That is, it is extremely difficult for these devices to be focused on a specific area to the exclusion of other areas.

Doppler-based radar devices require relative motion in the radial direction between the radar transmitter and the target. Stationary targets or targets moving such that their relative radial speed is small—such as a child playing or hiding underneath parked a vehicle—may not be detected at all or until the car starts to move, which may be too late to avoid a life-threatening accident.

Furthermore, these devices (acoustic and Doppler-based radar devices) cannot discriminate between different types of materials (e.g. concrete and masonry, animal tissue, plant tissue and metals). Objects detectable using these systems are classified as present or not present. Accordingly, these devices can sometimes be overly sensitive in the areas where they do work, since not all objects represent a hazard or potential for a serious accident.

SUMMARY OF THE INVENTION

In order to detect and classify objects in a relatively small obstruction-filled space (e.g. underneath a vehicle), a sensing method and apparatus incorporating the use of at least two carefully selected transmission frequencies is provided. In embodiments where the transmission frequencies are radio frequencies the sensing apparatus can be considered and analysed as a short-range radar system. Alternatively, if the transmission frequencies are acoustic the sensing apparatus can be considered and analysed as a sonar-based system.

When considering a short-range radar system, at least two radio frequencies are chosen such that a respective electromagnetic wave transmitted by the sensing apparatus at one radio frequency behaves differently from the corresponding electromagnetic wave (or waves) transmitted at the other radio frequency (or frequencies). In particular, it is beneficial that electromagnetic waves transmitted at the respective radio frequencies interact differently, with respect to one another, with various types of materials in a known and predictable manner. It is desirable that they are absorbed in or reflected from different materials in different ways with respect to one another.

Electromagnetic waves may reflect partially or completely from the interface between two different materials (e.g. between air and animal tissue). The complete characterization of this reflection from most real objects is an extremely difficult problem. The process depends on a number of factors including the orientation of the object, the frequency of the electromagnetic wave, the surrounding environment and the material structure of the object. The dependence on frequency is typically non-linear and is related to aspects of the object.

In general, a material has three properties which are important in electromagnetic terms: 1) its conductivity; 2) its permittivity; and, 3) its permeability. Conductivity is not usually a strong function of frequency in what is normally considered the radio frequencies (i.e. the RF frequency band). Permeability is generally not important except in the case of ferromagnetic materials. The permittivity is, however, a complex value having an imaginary part that leads to a frequency dependence of the material's reflectivity. Additionally, permittivity is often a nonlinear function of frequency that varies substantially, although in the RF frequency band, this variation is generally large only over large relative frequency spans (most of an octave, or more). Generally, the reflection intensity is proportional to the relative difference in material characteristics on opposite sides of the interface.

For objects that are considered large relative to the wavelength of a respective electromagnetic wave, the average reflection in the direction of the incident wave's source is proportional to the object's cross section, even though it may vary by orders of magnitude with small changes in orientation and shape. The frequency dependence on material can be made dominant for these cases by suitable averaging of target reflections, and this enables the identification of target type through the use of multiple well-chosen radar frequencies.

The sensing apparatus according to an embodiment of the invention can advantageously be mounted between the front and rear axles of a vehicle. The sensing method compensates for the inherent electromagnetic clutter caused by the obstructions (e.g. tires, drive shafts, etc.) in this relatively small space. Moreover, as will be discussed further below the beam patterns emitted from antennas included in the sensing apparatus can be re-shaped according to the specific environment that the sensing method and apparatus are deployed in.

The use of the at least two radio frequencies enables the sensing method (and apparatus) to extract information used to determine whether or not targets (if present) are animate or inanimate. That is, the sensing method is able to distinguish between living tissue and non-living tissue based on a comparison of the returns at each radio frequency. Further, animate objects can be classified as being either animals (e.g. people and pets) or plants.

Thus according to a first aspect of the invention there is provided a sensor system including: a first and second transmit signal chain for transmitting signals at respective first and second frequencies; a first and second receive signal chain for receiving reflections of the signals transmitted by the corresponding first and second transmit signal chains; and a signal processing unit for evaluating respective reflections received by the first and second receive signal chains to determine whether or not an object is composed of one type of material or of another type of material, the evaluation comprising a comparison of the respective reflections received by the first and second receive signal chains to a benchmark that indicates whether or not an object is of one type of material or another type of material; wherein the first and second frequencies are selected such that a different amount of energy from signals transmitted at the first frequency is reflected by materials of one type than from signals transmitted at the second frequency, and where similar amounts of energy are reflected by objects of another type from signals transmitted at both the first and the second frequencies.

According to another aspect of the invention there is provided a method of sensing including: i) transmitting signals on first and second frequencies; ii) receiving reflections of the transmitted signals at the first and second frequencies; iii) processing the received reflections of the transmitted signals to determine whether or not objects are present; and iv) if objects are present, further processing the reflections to determine whether or not objects are of a certain type of material or not, wherein the processing of the respective received reflections at the first and second frequencies to determine whether or not objects are of the certain type of material or not includes comparing the respective reflections received at the first and second frequencies to a benchmark to determine whether or not an object is of the certain type of material or not; wherein the first and second frequencies are selected such that a different amount of energy from signals transmitted at the first frequency is reflected by materials of one type than from signals transmitted at the second frequency, and where similar amounts of energy are reflected by objects of another type from signals transmitted at both the first and the second frequencies.

Other aspects and features of the present invention will become apparent, to those ordinarily skilled in the art, upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
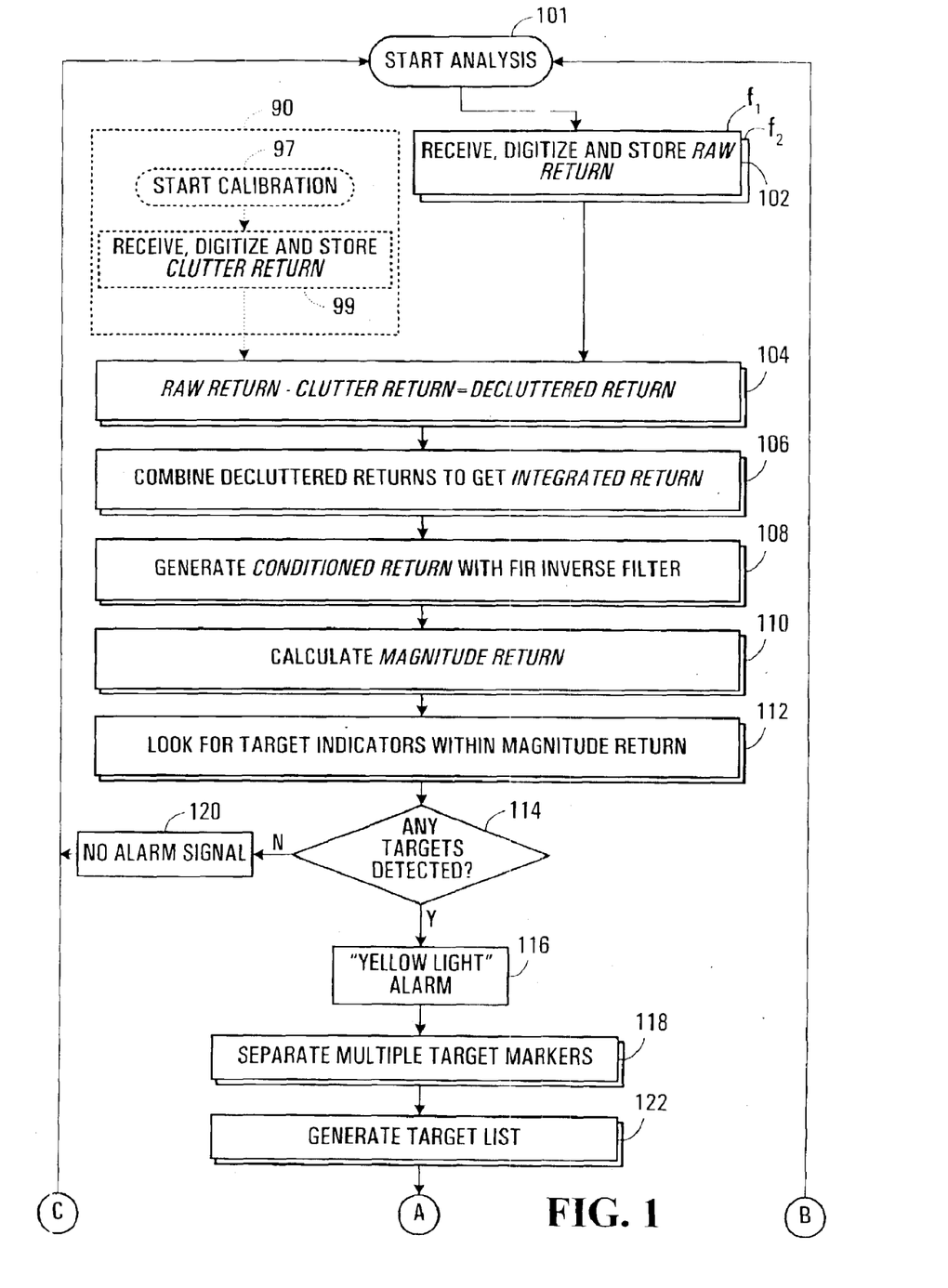
FIG. 1 is a flow chart depicting a method of sensing according to an embodiment of the invention.

Referring now to FIG. 1, shown is a flow chart depicting a method of sensing according to an embodiment of the invention. As described above, the invention generally involves the use of at least two frequencies. In this very specific example embodiment of the invention, the sensing method is described using two radio frequencies f1 and f2.

The In-phase (I) and Quadrature (Q) channels of each of the radio frequencies f1 and f2 are also advantageously used according to this embodiment of the invention. The advantages of using the I and Q channels are described further below in conjunction with the description of a very specific example of a corresponding sensing apparatus according to this embodiment of the invention. It is also noted that in other embodiments of the invention the I and Q channels of each radio frequency employed may or may not be used.

To begin, the method includes a set of calibration steps 90, which are normally carried out when the corresponding sensing apparatus is installed. The calibration steps 90 may also be routinely repeated in between uses to ensure optimal performance of the sensing method and apparatus. During the calibration steps 90 it is assumed that there are no targets (e.g. rocks, toddlers, pets, etc.) in the space to be monitored. However, the space to be monitored (e.g. under a vehicle) should contain within it the major features that are always going to be present, such as spare tires, water cans or toolboxes. It would be appreciated that the calibration steps 90 should be performed every time there is a significant change affecting the layout of the major features in the space.

At step 97 electromagnetic pulses are transmitted on each of the radio frequencies f1 and f2 into the empty space to be monitored. At step 99 return echoes (i.e. reflections of the electromagnetic pules) are received, measured and then digitized for the I and Q channels of both radio frequencies f1 and f2. The return echoes from the empty space represent the clutter return inherent to the space.

Once a measure of the clutter return is known the nominal operating steps can begin at step 101. During nominal operation the space may or may not have targets within it. Targets are considered to be unwanted objects, animals or people that are in the space.

At step 101, like in step 97, electromagnetic pulses are transmitted on each of the radio frequencies f1 and f2 into the space being monitored. A raw return will be received at step 102 that is made up of reflections from targets (if present) and the clutter return measured in the calibration steps 90. For the I and Q channels of each radio frequency f1 and f2 the clutter return is subtracted from the raw return at step 104. The result is a decluttered return for each radio frequency f1 and f2 that can be further processed to identify targets in the space being monitored.

At step 106 the processing of the decluttered return begins with an averaging of multiple decluttered return signals at each radio frequency f1 and f2 producing integrated returns for each radio frequency f1 and f2. In effect, the averaging can be simplified to a straight-forward addition of the decluttered components. Alternatively, a weighted average can also be calculated. The thermal and ambient noise in the decluttered signals is substantially uncorrelated with respect to that in other decluttered signals, while the reflection components will be strongly correlated. There will thus be an improvement seen in the received signal-to-noise ratio (SNR) by adding the signals together.

At step 108, the integrated returns are processed through respective inverse filters to create corresponding conditioned returns for each radio frequency f1 and f2. The inverse filters may be designed as either Finite Impulse Response (FIR) or Infinite Impulse Response (IIR) filters. For each radio frequency f1 and f2, a quadrature sum of the I and Q channels is calculated at step 110 from the respective conditioned returns. The quadrature sum of the I and Q channels for each radio frequency f1 and f2 represents the magnitude of the returned energy in the reflections and is thus termed a magnitude return.

At step 112, using signal samples of the magnitude returns calculated in step 110, a comparison to an energy threshold is made to identify potential targets. Samples above the energy threshold indicate that targets are present in the space being monitored. The samples that are above the energy threshold are termed target indicators. As will be discussed further below, samples from both radio frequencies f1 and f2 are lined up in time to accurately identify targets.

It is quite possible that there are no targets in the space and thus there should not be any samples above the energy threshold. Accordingly, at step 114 it is determined whether or not there are any target indicators at either radio frequency f1 or f2. If there are no target indicators (no path, step 114) then the sensing method proceeds to step 120 in which no alarm signal is activated, and the sensing method starts again at step 101 after deactivating any existing alarms. If target indicators are present (yes path, step 114) a "Yellow light" or caution alarm is activated at step 116.

Given that target indicators have been identified in the magnitude returns, at step 118 the conditioned returns for each of the radio frequencies f1 and f2 are more closely examined near in time to each of the target indicators. The presence of abrupt phase changes around the target indicators in the conditioned returns will strongly suggest the presence of multiple targets in close proximity to one another (i.e. multiple target markers).

At step 122, the target marker(s), are resolved and a target list is generated. It is preferable, although not necessary, that the target list is arranged according to range. The range (i.e. the distance of a target from the sensing apparatus) is easily calculated as a function of the time that reflection take to reach the sensing apparatus after the original electromagnetic pulses are transmitted into the space.

At step 124, the target list is more carefully scrutinised to distinguish animate and inanimate targets. If a target does not have a substantial return at both radio frequencies f1 and f2 (no path, step 124) it is considered to be a false positive and is deleted from the target list at step 132. Alternatively, if the target does have a return at both radio frequencies (yes path, step 124) the returns are further analysed in step 126.

At step 126 the magnitude returns at both radio frequencies f1 and f2 are compared to one another to establish a magnitude ratio. Given the orders of magnitude difference between the respective C- band and K-band frequencies employed, it is expected that returns from inanimate and animate targets will be substantially different. For example, animate tissue may reflect less energy at one frequency than at the other, whereas inanimate tissue may reflect substantially equal amounts of energy at both frequencies. Thus, a benchmark for determining whether or not a target is animate can be easily extrapolated from experimental data. If the magnitude return ratio meets the benchmark for an animate object (yes path, step 126) a "Red light" alarm is activated and the process continues from step 101. The red light alarm indicates that a living creature (e.g. a toddler) is in the space being monitored. Alternatively, if the magnitude ratio does not meet the benchmark that would indicate an animate object is present, the target is deleted from the target list at step 130.

After both steps 130 and 132, it is determined at step 134 whether or not there are remaining targets in the target list to be evaluated. If there is at least one more target (yes path, step 134) then the sensing method proceeds to step 124. If not (no path, step 134) then the sensing method proceeds to step 101 (via step 136) to start again.

Figure 2A:
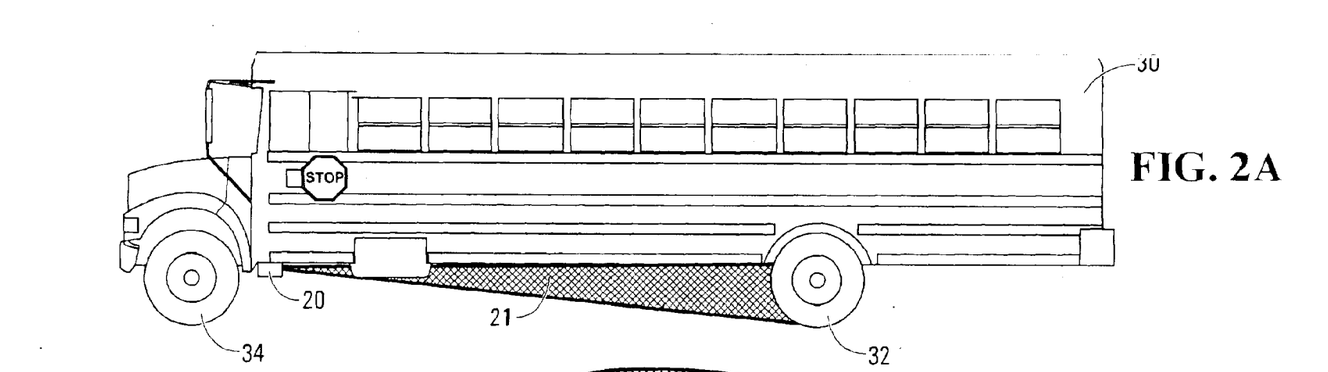
FIG. 2A is a side view of a school bus equipped with a sensing apparatus according to an embodiment of the invention.
Figure 2B:
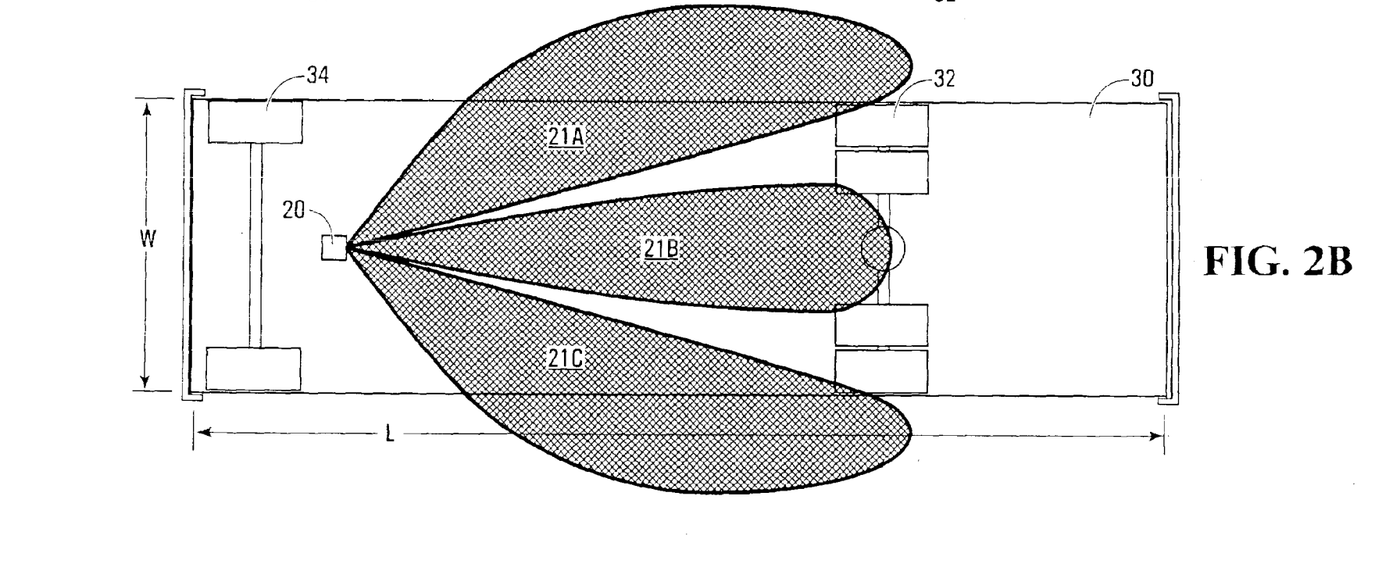
FIG. 2B is a bottom view of the school bus equipped with the sensing apparatus shown in FIG. 2A.

In FIGS. 2A and 2B shown is a side view and an underside view of a school bus 30 equipped with a sensing apparatus 20 designed according to the embodiment of the invention described above. The school bus 30 has a front wheel assembly 34 and a rear wheel assembly 32, both of which include tires, axles, wheel rods, etc. Further, it is understood that the underside of the school bus is not necessarily flat and includes a number of features that may act as electromagnetic reflectors (e.g. water cans, spare tires, etc.).

As shown in FIGS. 2A and 2B, the sensing apparatus 20 is placed in a central location behind the front wheel assembly underneath the school bus 30. However, the location of the sensing apparatus 20 can be different. For example, the sensing apparatus could bet placed in an offset location near the rear wheel assembly 32, while remaining between the front and rear wheel assemblies 34 and 32, respectively. Moreover, if the sensing apparatus 20 is used in a different application it would be understood by those skilled in the art that it could be adapted to have a different beam radiation pattern than the one described below.

The sensing apparatus 20, having been designed as a radar-like system, is equipped with antennas that transmit the aforementioned electromagnetic pulses into a wide beam pattern 21 consisting of three principal lobes 21a, 21b, and 21c in azimuth. Such a pattern can be created using a planar patch antenna array. In contrast, a typical radar system would scan the area to be monitored with a narrow "pencil" beam so that the exact location of targets can be ascertained. However, since the exact location of a target is not required and the space being monitored (in the case the underside of a school bus or other motor vehicle) is sufficiently limited in size the wide beam pattern 21 will suffice. Moreover, because the exact location of targets is not required the electronics used within the sensing apparatus are simplified.

Figure 3:
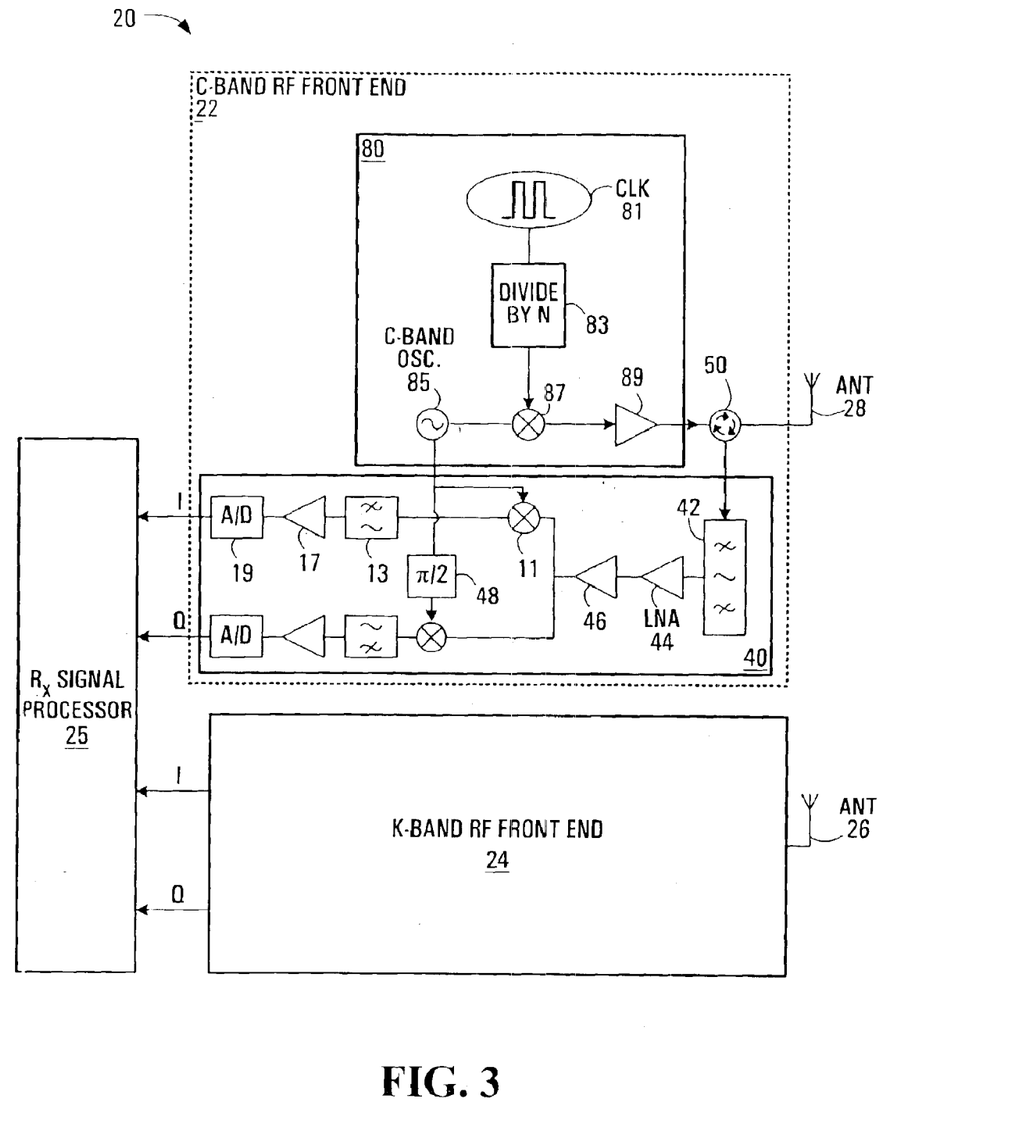
FIG. 3 is a schematic of the sensing apparatus shown in FIGS. 2A and 2B.

Shown in FIG. 3 is a partial schematic diagram of the sensing apparatus 20 shown in FIGS. 2A and 2B. Those skilled in the art would appreciate that the sensing apparatus 20 may be supported by an additional combination of hardware, software and/or firmware and shown in FIG. 3 are only those elements necessary to describe aspects of this embodiment of the invention.

The sensing apparatus 20 is made up of a receive ($R_x$) signal processor 25 which is connected to receive respective I and Q channels from a C-band RF front end 22 and a K-band RF front end 24. The K-band RF front end 24 is similar to that of the C-band RF front end 22. Accordingly, only the components of the C-band RF front end 22 are described in detail herein. It is commonly understood that the C-band comprises the range of radio frequencies from 4–8 Giga-Hertz (GHz); whereas the K-band comprises the range of radio frequencies from 18–27 GHz.

It would also be beneficial in practical applications for the C-band and K-band frequencies to reside within respective Industrial Scientific and Medical (ISM) bands so that operators are not required to purchase licenses to use sensing apparatus 20. For example, the C-band frequency could be 5.8 GHz and the K-band frequency could be 24 Ghz. Both of these frequencies reside in the ISM bands in the respective C-band and K-band of frequencies.

The C-band RF front end is made up of a transmit signal chain 80 and a receive signal chain 40. Both the transmit signal chain 80 and the receive signal chain 40 are coupled through a circulator 50 to an antenna 28. Again, in the present embodiment the antenna 28 is a patch antenna array designed to provide a wide bean pattern similar to that of wide beam pattern 21 shown in FIGS. 2A and 2B.

The transmit signal chain 80 includes a C-band oscillator 85. An output of the C-band oscillator 85 is coupled to a mixer/modulator 87. The mixer/modulator 87 is also coupled to receive an input from a divide-by-N pulse generator 83, which is itself coupled to receive a clock signal from a clock generator 81. The output of the mixer/modulator 87 is couple into a pre-transmission power amplifier 89 before being sent to the circulator 50.

In operation, the transmit signal chain 80 generates electromagnetic pulses in the C-band to be transmitted by the antenna 28. In one embodiment, each pulse would have a duration of about 2 ns and there would be 5 million pulses transmitted per second. The pulse signal provided by the pulse generator 83 would typically have a period of about 200 ns. Thus, the duty cycle of the electromagnetic pulses in relation to the pulse repetition interval would be on the order of 1%. However, in alternative embodiments the duty cycle could be substantially larger or smaller. A short pulse is advantageous because it allows reflections from relatively close targets to be detected. If the pulse is too long, the reflections from relatively close targets would arrive before the pulse duration is over and consequently they would not be detected. The pulse repetition interval is chosen such that reflections due to one pulse will be received before transmission of the next pulse, while transmitting as many pulses as possible in order to maximize the amount of information and noise reduction available.

Accordingly, the role of the divide by N pulse generator 83 is to use the clock signal provided by the clock generator 81 to produce a pulse signal with an appropriate duty cycle and frequency. This signal is delivered to the mixer/modulator 87 to modulate the C-band tone from the C-band oscillator 85 with the pulse signal.

The receive signal chain 40 is coupled to receive an input from the antenna 28 via the circulator 50, and an input from the C-band oscillator 85 of the transmit signal chain 80. The input from the circulator 50 is passed through a band pass filter 42. The band pass filter's output is in turn coupled in series to a low noise amplifier and receive-side pre-amplifier 46. The output of the receive-side pre-amplifier 46 is split into I and Q (i.e. in-phase and quadrature branches respectively) branches. The I and Q branches are substantially identical and accordingly only the I branch will be described in detail.

In series, from the receive-side pre-amplifier 46 the $R_x$ signal processor 25, the I branch is made up of a mixer 11, a filter 13, a post-amplifier 17 and an Analog-to-Digital Converter (A/D) 19. The output of the A/D 19 is coupled into the receive signal processor 25. The mixer 11 also receives the input from the C-band oscillator 85, which is also sent to a 90-degree phase shifter 48 en route to a corresponding mixer in the Q branch.

In operation the receive signal chain 40 receives and delivers the down-converted I and Q channels from the C-band reflections received by the sensing apparatus 20. Similarly, the K-band RF front end 24 would also deliver the down-converted I and Q channels from the K-band. All of the respective I and Q bands are coupled into the receive signal processor 25 that in turn processes them in accordance with the sensing method described above in relation to FIG. 1.

I-Q detection is preferably used because it permits the subtraction of clutter from the raw return more effectively than other methods such as envelope detection.

Figure 4:
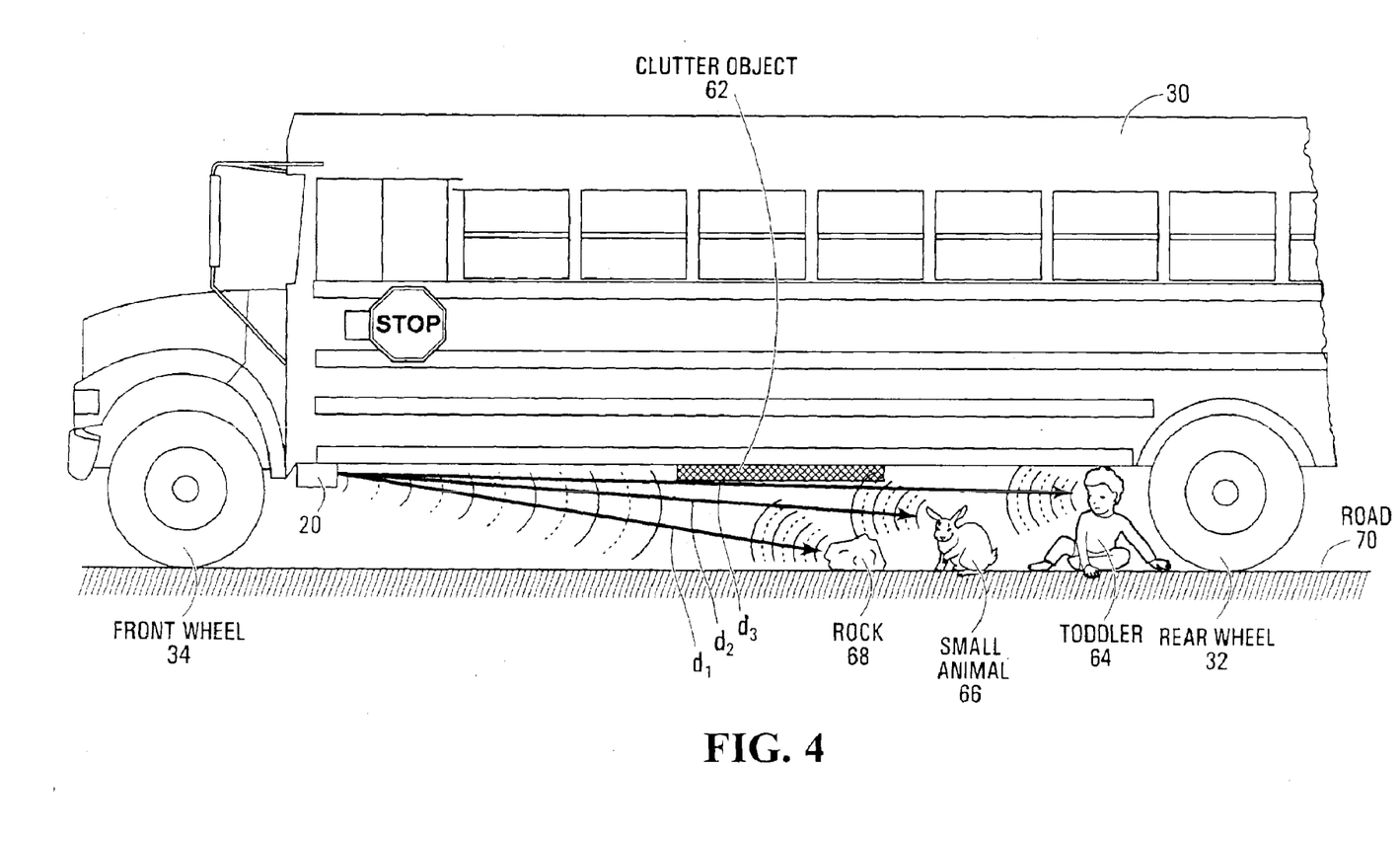
FIG. 4 is a side view of the school bus equipped with the sensing apparatus shown in FIGS. 2A and 2B in an operating scenario.

In FIG. 4 there is illustrated an example scenario including the school bus 30 and sensing apparatus 20 shown first in FIGS. 2A and 2B. In operation, the sensing apparatus 20 transmits pulsed radio frequency energy, in the form of electromagnetic waves, at two different frequencies of operation f1 and f2. Clutter from structural objects 62 and the road 70 is eliminated within the sensing apparatus 20 as described above in relation to the method disclosed.

Energy returns from the rear wheel assembly 32 are minimized by placing a null in the search pattern, through design and tuning of the antennas included in the sensing apparatus 20. Reflections are received from a rock 68, a small animal 66 and a toddler 64 located at distances $d_1$, $d_2$ and $d_3$ from the sensing apparatus 20, respectively.

The two frequencies of operation of the sensing apparatus 20 have been chosen to take advantage of the dielectric properties of living tissue and concrete or rock. Concrete's dielectric constant will vary only slightly between the C-band and K-band, while the dielectric constant of animate targets exhibits a much larger variance. In general, the permittivity of living tissue increases and becomes more lossy as the frequency increases, and thus the difference between living tissue and the surrounding air also increases. The ratio of the average reflection magnitude at the K-band in relation to that at the C-band from animate targets is therefore larger than the corresponding ratio for inanimate targets. There must be sufficient variation between the permittivity of living tissue at the two chosen frequencies of operation to enable differentiation between inanimate materials and animal or human tissue.

In the case of the rock 68, the average returned signals from the "low" and "high" frequency transmissions correspond to approximately constant permittivity, and a "yellow light" alarm 116 is generated, indicating a target of concern which is not a living organism but could still possibly damage or be damaged by the vehicle.

In contrast, in the case of the small animal 66 and the toddler 64, the returned signals received at the sensing apparatus will be significantly different in magnitude as described above. The receive signal processor (25) will generate a "red light" alarm (128), indicating a living target has been detected.

In alternative embodiments analogous acoustic effects can be used in sonar-based sensing systems incorporating aspects of the inventions. Those skilled in the art would appreciate that multiple sound waves of respective different frequencies could be used to determine the composition of different materials in a manner similar to that described above.

What has been described is merely illustrative of the application of the principles of the invention. Other arrangements and methods can be implemented by those skilled in the art without departing from the spirit and scope of the present invention.

We claim:

1. A sensor system comprising:
    a first and second transmit signal chain for transmitting signals at respective first and second frequencies;
    a first and second receive signal chain for receiving reflections of the signals transmitted by the corresponding first and second transmit signal chains; and
    a signal processing unit for evaluating respective reflections received by the first and second receive signal chains to determine whether or not an object is composed of one type of material or of another type of material, the evaluation comprising a comparison of the reflections received by the first receive signal chain to the reflections received by the second received signal chain, which comparison is measured against a benchmark that indicates whether or not an object is of one type of material or another type of material;

wherein the first and second frequencies are selected such that the ratio of the amount of energy reflected at the first frequency to the amount of enegy reflected at the second frequency by the one type of material is significantly greater than the ratio of the amount of energy reflected at the first frequency to the amount of energy reflected at the second frequency by the other type of material.

2. The sensor system of claim 1, wherein the signal processor calculates a magnitude ratio of the respective reflections received by the first and second receive signal chains, which is then compared to the benchmark.

3. The sensor system of claim 1, wherein the first and second frequencies are radio frequencies in the C-band and K-band respectively.

4. The sensor system of claim 3, wherein the reflections are decomposed into In-phase and Quadrature channels of both the first and second frequencies.

5. The sensor system of claim 1, wherein the first and second frequencies are both acoustic frequencies.

6. The sensor system of claim 5, wherein the reflections are decomposed into In-phase and Quadrature channels of both the first and second frequencies.

7. The sensor system of claim 1, wherein the objects of one type of material are animal or human and the objects of another type of material are non-animal and non-human.

8. The sensor system of claim 1 mounted onto the underside of a vehicle between the front and rear wheel assemblies.

9. The sensor system of claim 1, wherein the first and second transmit signal chains include pulse generators for transmitting the signals at respective first and second frequencies as electromagnetic pulses.

10. The sensor system of claim 9, wherein the reflections are decomposed into In-phase and Quadrature channels of both the first and second frequencies.

11. The sensor system of claim 1, wherein the signal processor subtracts a static clutter estimation from the respective reflections received at the first and second frequencies.

12. The sensor system of claim 11, wherein the reflections are decomposed into In-phase and Quadrature channels of both the first and second frequencies.

13. The sensor system of claim 1, wherein the reflections are decomposed into In-phase and Quadrature channels of both the first and second frequencies.

14. A method of sensing comprising:
   i) transmitting signals on first and second frequencies;
   ii) receiving reflections of the transmitted signals at the first and second frequencies;
   iii) processing the received reflections of the transmitted signals to determine whether or not objects are present; and
   iv) if objects are present, further processing the reflections to determine whether or not objects are of a certain type of material or not, wherein the processing of the respective received reflections at the first and second frequencies to determine whether or not objects are of the certain type of material or not includes comparing the reflections received at the first frequency to the reflections received at the second frequency and measuring the comparison against a benchmark to determine whether or not an object is of the certain type of material or not;
   wherein the first and second frequencies are selected such that the ratio of the amount of energy reflected at the first frequency to the amount of energy reflected at the second frequency by the certain type of material is significantly greater than the ratio of the amount of energy reflected at the first frequency to the amount of energy reflected at the second frequency by other types of material.

15. The method of sensing according to claim 14, wherein the processing of the reflections to determine whether or not objects are of the certain type of material or not includes calculating a magnitude ratio of the respective reflections at the first and second frequencies, which is then compared to the benchmark.

16. The method of sensing according to claim 14, wherein the first and second frequencies are radio frequencies in the C-band and K-band respectively.

17. The method of sensing according to claim 16, wherein the reflections are decomposed into In-phase and Quadrature channels of both the first and second frequencies.

18. The method of sensing according to claim 14, wherein the first and second frequencies are both acoustic frequencies.

19. The method of sensing according to claim 18, wherein the reflections are decomposed into In-phase and Quadrature channels of both the first and second frequencies.

20. The method of sensing according to claim 14, wherein the objects of one type of material are animal or human and the objects of another type of material are non-animal and non-human.

21. The method of sensing according to claim 14, further comprising the step of subtracting a static clutter estimation from the respective reflections received at the first and second frequencies.

22. The method of sensing according to claim 21, wherein the reflections are decomposed into In-phase and Quadrature channels of both the first and second frequencies.

23. The method for sensing according to claim 14, wherein the signals transmitted on the first and second frequencies are transmitted simultaneously.

24. The method of sensing according to claim 14, wherein the signals transmitted on the first and second frequencies are transmitted as electromagnetic pulses.

25. The method of sensing according to claim 24, wherein the reflections are decomposed into In-phase and Quadrature channels of both the first and second frequencies.

26. The method of sensing according to claim 14, wherein the reflections are decomposed into In-phase and Quadrature channels of both the first and second frequencies.

27. The method of sensing according to claim 14, wherein the signals transmitted in step i) are unobstructed prior to engaging any objects present and the signals received in step ii) are unobstructed.

* * * * *